United States Patent
Hsu et al.

(10) Patent No.: US 8,174,500 B2
(45) Date of Patent: May 8, 2012

(54) TEMPERATURE CONTROLLED MOUSE

(75) Inventors: Yi-Ping Hsu, Jhonghe (TW);
Tao-Cheng Yen, Sanchong (TW);
Er-Hao Chen, Tucheng (TW);
Chung-Hao Yeh, Taipei (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 478 days.

(21) Appl. No.: 12/424,708

(22) Filed: Apr. 16, 2009

(65) Prior Publication Data

US 2010/0156791 A1 Jun. 24, 2010

(30) Foreign Application Priority Data

Dec. 18, 2008 (CN) .......................... 2008 1 0220259

(51) Int. Cl.
*G06F 3/033* (2006.01)
(52) U.S. Cl. ....................... 345/163; 345/156
(58) Field of Classification Search .......... 345/156–167
See application file for complete search history.

(56) References Cited

U.S. PATENT DOCUMENTS

| | | | | |
|---|---|---|---|---|
| 5,841,425 A * | 11/1998 | Zenz, Sr. ................... | 345/163 |
| 6,190,314 B1 * | 2/2001 | Ark et al. .................. | 600/300 |
| 7,734,321 B2 * | 6/2010 | White ....................... | 600/310 |
| 7,995,034 B2 * | 8/2011 | Pope et al. ................ | 345/163 |
| 2005/0146499 A1 * | 7/2005 | Casebolt et al. ............ | 345/157 |
| 2006/0274041 A1 * | 12/2006 | Han .......................... | 345/163 |
| 2008/0198131 A1 * | 8/2008 | Rondot ...................... | 345/158 |

FOREIGN PATENT DOCUMENTS

JP 11119906 A * 4/1999

* cited by examiner

*Primary Examiner* — Amare Mengistu
*Assistant Examiner* — Dmitriy Bolotin
(74) *Attorney, Agent, or Firm* — Li&Cai Intellectual Property (USA) Office

(57) ABSTRACT

A temperature controlled mouse includes a central controller, a driver control circuit, a temperature control circuit, and a signal transmitting circuit. The driver control circuit generates coordinate control signals and pointer clicking signals, and the signals are transmitted to a host computer coupled to the mouse via the signal transmitting circuit. The temperature control circuit detects the changes of the temperature from a user's hand and thereby generates temperature control signals. The central controller controls the operation status of the mouse according to the temperature control signals, wherein when the temperature detected is within a predetermined temperature range, the central controller wakes the mouse and allows the transmission of signals from the mouse to the host computer; otherwise the central controller stops the transmission of signals. The temperature controlled mouse prevents accidental activation due to negligent bump. Thereby the mouse may only wake from purposeful control and thereby conserves energy.

9 Claims, 4 Drawing Sheets

TEMPERATURE CONTROLLED MOUSE

BACKGROUND OF THE INVENTION

1. Field of the Invention

The present invention relates to a mouse; in particular, to a mouse that has its operation status controlled via sensing changes in temperature.

2. Description of Related Art

A mouse is an important peripheral component for controlling computers, and as technology develops, the variety of mouse types also increases accordingly. Subsequently, variety of mouse types has evolved from mechanical type mouse into optical type mouse. However for a traditional optical type mouse, the internal light source therein would stay on when the optical mouse has been electrically activated, so that even though the mouse has stopped moving, the optical mouse would still remain in operating mode and remain illuminated for an extended length of time. Therefore, power would be wasted when the mouse is accidentally touched and awaken from a power conserving mode.

Based on the aforementioned issue, once a mouse has been awaken it would be in an operation status and be illuminating for an extended length of time, which would waste energy no matter if the act of awaking the mouse is through a conscious touch or an accidental touch. Furthermore the mouse would be illuminated continuously for an extended length of time even thought the user's hand has already left the mouse and no operation is required.

This traditional way of awaking the mouse lacks an efficiency management for the operation status of the mouse, and thereby results in substantial waste of energy.

Therefore, providing a mouse that may reasonably manage operation status so as to resolve the aforementioned issue is necessary so as to conserve energy.

SUMMARY OF THE INVENTION

The object of the present invention is to provide a temperature controlled mouse, wherein the mouse has its operation status controlled via sensing temperature changes upon the surface of the mouse, so as to prevent the mouse from awaking unintentionally and go into operating mode, thereby the present invention achieves the goal of saving energies.

In order to achieve the aforementioned objects, according to an embodiment of the present invention, a temperature controlled mouse is provided, the mouse includes:

a casing;

a central controller, installed within the casing, for controlling the operation status of the mouse;

a driver control circuit, electrically connected with the central controller, for generating coordinate control signal via detecting the movement track of the mouse, and generating a pointer clicking signal via detecting the touch pressure status of the mouse;

a temperature control circuit, electrically connected with the central controller, for generating a temperature control signal via detecting the changes of the temperature from a user's hand; and a signal transmitting circuit, electrically connected with the driver control circuit, for transmitting the coordinate control signal and the pointer clicking signal to a host computer that is electrically connected to the signal transmitting circuit.

In the present invention, the central controller adjusts the operation status of the mouse according to the temperature control signal: when the temperature detected by the temperature control circuit is within a predetermined temperature range, then the temperature control signal generated by the temperature control circuit feeds back to the central controller, thereby the central controller controls the driver control circuit to activate the operation of the mouse, so that the signals generated by the driver control circuit of the mouse are transmitted to the host computer via the signal transmitting circuit; and when the temperature detected by the temperature control circuit becomes greater than or less than the predetermined temperature range, then the temperature control signal generated by the temperature control circuit feeds back to the central controller, thereby the central controller controls the driver control circuit to deactivate the operation of the mouse, so that the signals generated by the driver control circuit of the mouse are not transmitted to the computer house.

Therein, the temperature control circuit includes:

a temperature sensing module, for detecting the changes of the temperature from the user's hand, and output a temperature digital signal; wherein the temperature sensing module is a contact-type temperature sensor module; and a temperature comparison circuit, electrically connected to the temperature sensing module and the central controller respectively, for receiving the temperature digital signal outputted by the temperature sensing module, comparing the temperature digital signal with the predetermined temperature range, and generating a temperature comparison result; wherein the temperature comparison result is transmitted to the central controller, so that the central controller may control the operation status of the mouse according to the temperature comparison result. Therein the predetermined temperature range of the temperature comparison circuit is 25° C. to 35° C.

Therein, the driver control circuit includes:

a coordinate driving circuit, for detecting the movement track of the mouse, and generating the coordinate control signal according to the movement track; wherein the coordinate control signal is transmitted to the host computer, so as to control the synchronous movement of a pointer upon the screen of the host computer; and a pointer driving circuit, for detecting the touch pressure status of buttons on the mouse, thereby generating the pointer clicking signal, and the pointer clicking signal is transmitted to the host computer so as to control a corresponding program that reacts to the clicking of the mouse.

As compared with traditional technology, the temperature controlled mouse provided by the present invention utilizes a temperature control circuit so as to detect the temperature change from a user's hand and controls the operation status of the mouse accordingly. For example, once the detected temperature becomes greater than or less than a predetermined temperature range, then the mouse automatically goes into power saving mode (i.e. sleep mode), and all unnecessary module and circuit within the mouse ceases operation, so as to achieve the object of energy conservation; on the other hand, if the detected temperature is within the predetermined temperature range, then the mouse is awaken and goes into operation, so that the mouse may be driven and pointers for a host computer may be controlled. Thereby, the temperature controlled mouse changes how a traditional mouse is awaken from power saving mode and enters into operating mode, so as to prevent the mouse from being kept in operating mode accidentally due to careless bumping or unintentional touches, therefore the mouse may only be awaken from purposeful control, and thus achieves the goal of power saving.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
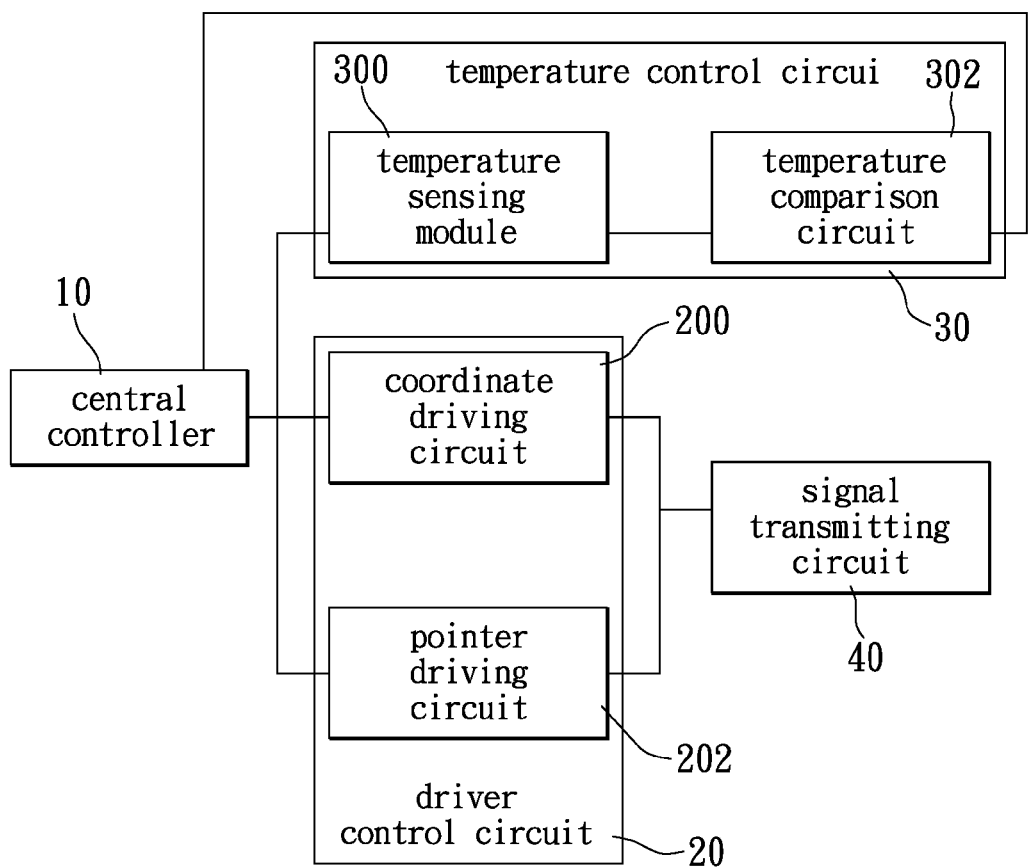
FIG. 1 shows a circuit diagram of a temperature controlled mouse according to a first embodiment of the present invention.
Figure 2:
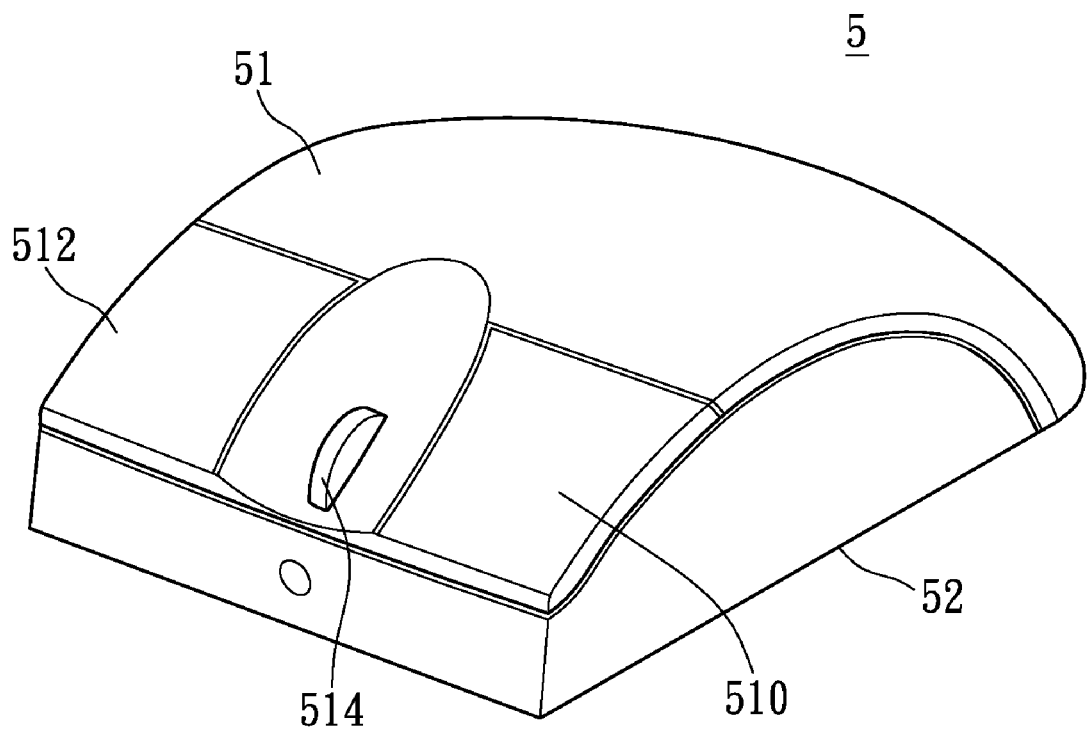
FIG. 2 shows a perspective diagram of a temperature controlled mouse according to an embodiment of the present invention.

Please refer to FIGS. 1 and 2, the present invention provides a temperature controlled mouse 1, hereafter referred to as mouse 1. Therein, the mouse 1 has its operation status controlled through sensing temperature changes upon the surface of the mouse 1. The mouse 1 includes a casing 5, a central controller 10 installed with the casing 5, a driver control circuit 20 that is connected with the central controller 10, a temperature control circuit 30, and a signal transmitting circuit 40. Therein, the central controller 10 is for controlling the operation status of each circuit within the mouse 1; the driver control circuit 20 is for generating a coordinate control signal via detecting the movement track of the mouse 1, and for generating a pointer clicking signal via detecting the touch pressure status of the mouse 1; the temperature control circuit 30 is for generating a temperature control signal via detecting the changes of the temperature from a user's hand; the signal transmitting circuit 40 is furthermore electrically connected with the driver control circuit 20, for transmitting the coordinate control signal and the pointer clicking signal to a host computer (not shown) that is electrically connected to the signal transmitting circuit 40.

Refer to FIG. 1, in the present invention, the aforementioned central controller 10 is a micro controller unit (MCU), which is for controlling the operation of circuits and modules within the mouse 1, and may adjust the operation status of the mouse 1 according to the temperature control signal generated by the temperature control circuit 30, so as to maintain the optimized operation status for the mouse 1.

The aforementioned driver control circuit 20 includes a coordinate driving circuit 200 and a pointer driving circuit 202, wherein the coordinate driving circuit 200 includes grating signal sensor (not shown) that may detect the movement track of the mouse 1, so that the coordinate driving circuit 200 may generate the coordinate control signal according to the movement track. Therein, the coordinate control signal reflects the mouse 1 movement change between its vertical and horizontal position, and is transmitted to the host computer, so as to achieve the control of the synchronous movement of the pointer upon the screen of the host computer, which is done by processing and transforming of computer programming. The pointer driving circuit 202 may detect the touch pressure status of buttons on the mouse 1, so that when the user click or press the buttons of mouse 1, a pointer clicking signal is generated, and then the pointer clicking signal is transmitted to the host computer, so as to control a variety of corresponding program by the combination of a coordinate driving circuit 200 and a pointer driving circuit 202.

Refer to FIG. 2, the aforementioned casing 5 includes a contact surface 51 and a non-contact surface 52, the contact surface 51 has a curved shape, and the mouse 1 is held via the contact surface 51. Therein the contact surface 51 includes a left button 510, a right button 512, and a scroll wheel 514 between the two buttons; and the pointer driving circuit 202 may transmit the pointer clicking signal to the host computer when an external force clicks or pushes on any of the buttons; furthermore, the scroll wheel 514 may drive the coordinate driving circuit 200 to generate and transmit a coordinate control signal to the host computer, and thereby controls the movement of the pointer upon the screen of the host computer. The non-contact surface 54 is essentially flat, and is installed at the bottom of the contact surface 51; therein the non-contact surface 52 and the contact surface 51 forms an install space, which is for containing each circuits and modules. Thereby, the mouse 1 may slide upon any flat surface through the non-contact surface 52.

The aforementioned temperature control circuit 30 includes a temperature sensing module 300 and a temperature comparison circuit 302. Therein, the temperature sensing module 300 is for detecting the changes of the temperature from the user's hand, and for outputting a temperature digital signal that reflects the temperature. The temperature digital signal is transmitted to the temperature comparison circuit 302 for comparison analysis, and as a preferred embodiment, the temperature sensing module 300 is a contact-type temperature sensor module. Additionally, the temperature sensing module 300 is contained within the install space of the casing 5; more specifically, the temperature sensing module 300 is installed on the interior wall of the contact surface 51 of the casing 5; thereby when the user's hand held the contact surface 51 of the casing 5, the body temperature (i.e. hand temperature) is quickly conducted with the temperature sensing module 300. Due to the fact that the temperature sensing module 300 is installed on the interior wall of the casing 5, therefore there is a slightly resistance to heat conduction due to the casing 5, and so that there is a certain delay in time for constant heat to conduct to the temperature sensing module 300. In other words, if the time of holding the mouse 1 with the user's hand is too short or if a heat source accidentally bumps with the mouse 1 for a short time, then the temperature may not reach the predetermined temperature range, therefore the operation of the mouse 1 is not activated. The aforementioned temperature comparison circuit 302 is electrically connected with the temperature sensing module 300 and the central controller 10, for receiving the temperature digital signal outputted by the temperature sensing module 300, comparing the temperature digital signal with the predetermined temperature range, and generating a temperature comparison result. Therein the temperature control circuit 30 feeds back the temperature comparison result with the generated temperature control signal to the central controller 10, so that the central controller 10 may control the operation status of the mouse 1 according to the temperature comparison result.

The central controller 10 controls the operation status of the mouse 1 according to the temperature comparison result, specifically:

When the temperature detected by the temperature control circuit 30 is within a predetermined temperature range of the temperature comparison circuit 302 according to temperature comparison, then the temperature control signal generated by the temperature control circuit 30 feeds back the temperature comparison result to the central controller 10, thereby the central controller 10 controls the driver control circuit 20 to activate the operation of the mouse 1 and the mouse 1 switches from "power saving mode" to "operating mode", so that the signals generated by the driver control circuit 20 of the mouse 1 are transmitted to the host computer via the signal transmitting circuit 40, so as to drive the movement of the pointer upon the screen of the host computer.

When the temperature detected by the temperature control circuit 30 becomes greater than or less than a predetermined temperature range according to temperature comparison, then the temperature control signal generated by the temperature control circuit 30 feeds back the temperature comparison result to the central controller 10, thereby the central controller 10 controls the driver control circuit 20 to deactivate the operation of the mouse 1 and the mouse enters "power saving mode", so that the signals generated by the driver control circuit 20 of the mouse 1 are not transmitted to the host computer.

In the present invention, the predetermined temperature range of the temperature control circuit 30 is 25° C. to 35° C., but this range is merely an example of the preferred predetermined temperature range, and is not for limiting the range of embodiments for the present invention. In order for mouse 1 to only be driven when held by a user, the lower temperature value of the predetermined temperature range is set close to the body temperature of the user; therefore only when the user is holding the mouse 1 may the mouse 1 temperature raise to near the body temperature of the user, and thereby driving the mouse 1 to enter into the operating mode. Through the aforementioned way, accidental bumping or touching does not activate the mouse 1, and so the mouse 1 is prevented from needlessly entering into "operating mode", thereby effect of power saving is achieved.

In the present invention, the aforementioned signal transmitting circuit 40 is electrically connected with the driver control circuit 20, and the signal transmitting circuit 40 is for transmitting the coordinate control signal and the pointer clicking signal to the host computer, so as to control the operation of the pointer according to the coordinate control signal. Therein the signal transmitting circuit 40 is a wired transmission circuit or a wireless transmission circuit; accordingly, the mouse 1 may be a wired mouse or a wireless mouse.

Figure 3:
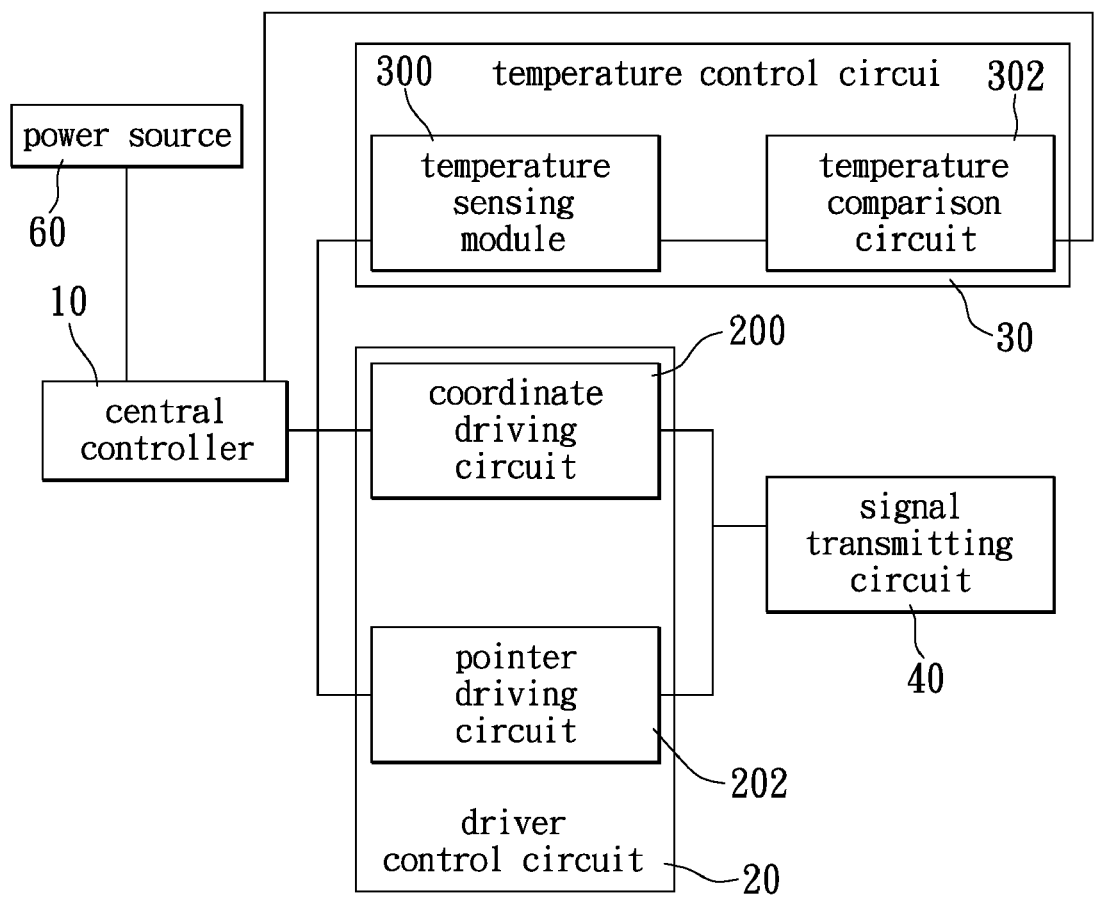
FIG. 3 shows a circuit diagram of a temperature controlled mouse according to a second embodiment of the present invention.

Refer to FIG. 3, in another embodiment of the present invention, the mouse 1a further includes a power source 60 that is electrically connected with the central controller 10, so as to provide the required power for the operation of the mouse 1a.

Figure 4:
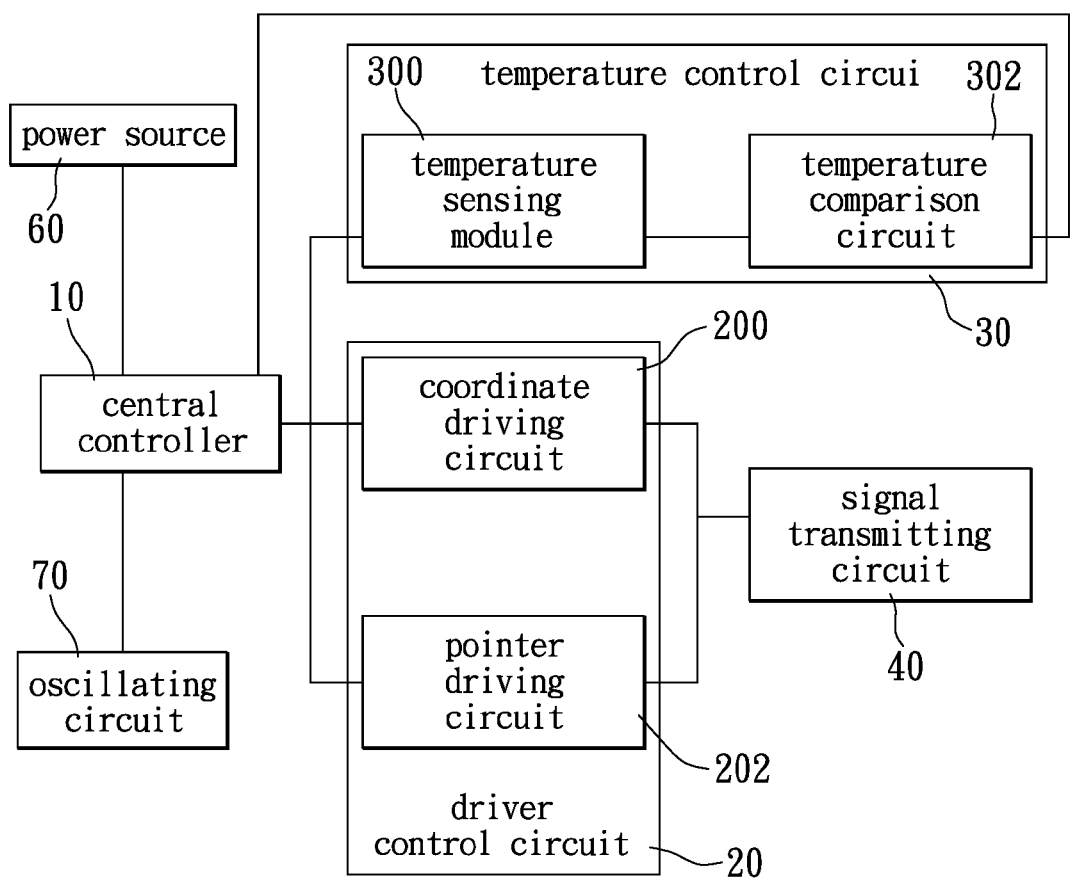
FIG. 4 shows a circuit diagram of a temperature controlled mouse according to a third embodiment of the present invention.

Refer to FIG. 4, in another embodiment of the present invention, the mouse 1b further includes an oscillating circuit 70 that is electrically connected with the central controller 10, and the oscillating circuit 70 is for facilitating the central controller 10 to correctly execute program code, and for stabilizing the operation of an oscillator (not shown) within the mouse 1b. Therein, the existence of an oscillator within a mouse is well known in the art, thus will not be described in further detail.

The temperature controlled mouse 1, 1a, 1b of the present invention detects the temperature upon the casing 5 through the temperature control circuit 30. Therein the temperature control circuit 30 compares this detected temperature against a predetermined temperature range, so as to determine if the detected temperature falls within the predetermined temperature range. If the detected temperature is within the predetermined temperature range, then the central controller 10 activates the driver control circuit 20 to electrically connect with the signal transmitting circuit 40, so that the mouse 1, 1a, 1b switches from "power saving mode" to "operating mode", thereby the mouse 1, 1a, and 1b is awaken for operation. Otherwise, if the detected temperature is not within the predetermined temperature range, then the central controller 10 deactivate the operation of the mouse 1 and disconnects the electrical connection between the driver control circuit 20 and the signal transmitting circuit 40, so that the mouse 1, 1a, 1b may be maintained at "power saving mode". Using an optical mouse as an example, a brief bump or accidental touch does not awaken the mouse for operation, so that signals are not transmitted to the host computer. Therefore, the operation status of the mouse is according to external temperature, thereby the mouse is prevented from needlessly going into operating mode, and the end result is that power consumption may be reduced, so the effect of power saving is achieved.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A temperature controlled mouse, the mouse comprising:
 a casing;
 a central controller, which is installed within the casing, for controlling operations of the mouse;
 a driver control circuit, which is electrically connected with the central controller, for generating a coordinate control signal via detecting a movement track of the mouse, and generating a pointer clicking signal via detecting a touch pressure status of the mouse;
 a temperature control circuit, which is electrically connected with the central controller, for generating a temperature control signal via detecting changes of a temperature from a user's hand; and
 a signal transmitting circuit, which is electrically connected with the driver control circuit, for transmitting the coordinate control signal and the pointer clicking signal to a host computer that is electrically connected to the signal transmitting circuit
 wherein the central controller adjusts the operation of the mouse according to the temperature control signal;
 wherein when the temperature detected by the temperature control circuit is within a predetermined temperature range, the temperature control signal generated by the temperature control circuit is fed back to the central controller allowing for the central controller to control the driver control circuit to activate the operation of the mouse, with signals generated by the driver control circuit being transmitted to the host computer via the signal transmitting circuit; otherwise, the temperature control signal generated by the temperature control circuit is fed back to the central controller causing the central controller to control the driver control circuit to deactivate the operation of the mouse, with the signals generated by the driver control circuit being not transmitted to the host computer.

2. The temperature controlled mouse according to claim 1, wherein the temperature control circuit comprises:
   a temperature sensing module, for detecting the changes of the temperature from the user's hand, and outputting a temperature digital signal; and
   a temperature comparison circuit, which is electrically connected to the temperature sensing module and the central controller respectively, for receiving the temperature digital signal outputted by the temperature sensing module, comparing the temperature digital signal with the predetermined temperature range, and generating a temperature comparison result, wherein the temperature comparison result is transmitted to the central controller, so that the central controller controls the operation of the mouse according to the temperature comparison result.

3. The temperature controlled mouse according to claim 2, wherein the temperature sensing module is a contact-type temperature sensor module.

4. The temperature controlled mouse according to claim 2, wherein the predetermined temperature range of the temperature comparison circuit is 25° C. to 35° C.

5. The temperature controlled mouse according to claim 2, wherein the casing comprises a contact surface allowing for the user to hold on to and a non-contact surface, and the temperature sensing module is installed on an interior wall of the contact surface.

6. The temperature controlled mouse according to claim 1, wherein the driver control circuit comprises:
   a coordinate driving circuit, for detecting the movement track of the mouse, and generating the coordinate control signal according to the movement track, wherein the coordinate control signal is transmitted to the host computer for controlling a pointer upon a screen of the host computer to be moved synchronously; and
   a pointer driving circuit, for detecting the touch pressure status of buttons on the mouse, thereby generating the pointer clicking signal, with the pointer clicking signal being transmitted to the host computer.

7. The temperature controlled mouse according to claim 1, wherein the mouse further comprises an oscillating circuit, and the oscillating circuit is electrically connected with the central controller, for facilitating the central controller to correctly execute program codes, and to stabilize operations of an oscillator within the mouse.

8. The temperature controlled mouse according to claim 1, wherein the signal transmitting circuit is a wired transmission circuit or a wireless transmission circuit.

9. The temperature controlled mouse according to claim 1, wherein the mouse further comprises a power source, and the power source is electrically connected with the central controller, for providing a required power for the operation of the mouse.

* * * * *